(12) United States Patent
Imazawa et al.

(10) Patent No.: US 10,840,752 B2
(45) Date of Patent: Nov. 17, 2020

(54) AUTOMOTIVE ROTARY ELECTRIC MACHINE

(71) Applicant: Mitsubishi Electric Corporation, Tokyo (JP)

(72) Inventors: Yoshiro Imazawa, Tokyo (JP); Yuki Uesato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

(21) Appl. No.: 15/795,382

(22) Filed: Oct. 27, 2017

(65) Prior Publication Data

US 2018/0342915 A1 Nov. 29, 2018

(30) Foreign Application Priority Data

May 24, 2017 (JP) .................................. 2017-102526

(51) Int. Cl.
*H02K 1/24* (2006.01)
*H02K 19/22* (2006.01)
(Continued)

(52) U.S. Cl.
CPC .............. *H02K 1/243* (2013.01); *H02K 1/12* (2013.01); *H02K 1/14* (2013.01); *H02K 1/24* (2013.01);
(Continued)

(58) Field of Classification Search
CPC .......... H02K 1/24; H02K 1/243; H02K 19/22; H02K 1/12; H02K 1/14; H02K 5/04;
(Continued)

(56) References Cited

U.S. PATENT DOCUMENTS 5,270,605 A * 12/1993 Lefrancois ............. H02K 19/22
310/263
6,097,130 A 8/2000 Umeda et al.
(Continued)

FOREIGN PATENT DOCUMENTS

CN 1208277 A 2/1999
JP 3929615 B2 6/2007

OTHER PUBLICATIONS

Communication dated Oct. 30, 2019, from The State Intellectual Property Office of the P.R. of China in counterpart Application No. 201810044769.1.

*Primary Examiner* — Tran N Nguyen
*Assistant Examiner* — Leda T Pham
(74) *Attorney, Agent, or Firm* — Sughrue Mion, PLLC; Richard C. Turner (57) ABSTRACT

First side surfaces 22bb of first magnetic pole portions 22b and second side surfaces 23bb of second magnetic pole portions 23b that face each other in a circumferential direction are configured into parallel flat surfaces, first circumferentially tapered portions 25b are formed on circumferential shoulder portions of the first magnetic pole portions 22b, second circumferentially tapered portions 26b are formed on circumferential shoulder portions of the second magnetic pole portions 23b, and portions of the first and second circumferentially tapered portions 25b and 26b enter a region 24 in which the first side surfaces 22bb and the second side surfaces 23bb that face each other in the circumferential direction overlap when viewed from a direction that is perpendicular to the first side surfaces 22bb and the second side surfaces 23bb.

5 Claims, 8 Drawing Sheets (51) Int. Cl.
*H02K 7/10* (2006.01)
*H02K 1/14* (2006.01)
*H02K 1/26* (2006.01)
*H02K 1/12* (2006.01)
*H02K 5/04* (2006.01)
H02K 9/06 (2006.01)
H02K 3/18 (2006.01)

(52) U.S. Cl.
CPC ................. *H02K 1/26* (2013.01); *H02K 5/04* (2013.01); *H02K 7/10* (2013.01); *H02K 19/22* (2013.01); *H02K 3/18* (2013.01); *H02K 9/06* (2013.01); *H02K 2213/03* (2013.01)

(58) Field of Classification Search
CPC .. H02K 7/10; H02K 1/26; H02K 3/18; H02K 2213/03; H02K 9/06
USPC ........................................................ 310/263
See application file for complete search history.

(56) References Cited

U.S. PATENT DOCUMENTS

| | | | | |
|---|---|---|---|---|
| 6,114,793 | A * | 9/2000 | Asao | H02K 9/06 310/263 |
| 6,700,296 | B1 * | 3/2004 | Oohashi | H02K 1/243 310/156.66 |
| 6,710,506 | B2 * | 3/2004 | Ishizuka | H02K 1/243 310/263 |
| 6,806,617 | B1 * | 10/2004 | Chen | H02K 1/243 310/263 |
| 7,679,259 | B2 * | 3/2010 | Lutz | H02K 1/243 310/156.66 |

* cited by examiner

COMPARATIVE EXAMPLE

AUTOMOTIVE ROTARY ELECTRIC MACHINE

BACKGROUND OF THE INVENTION

1. Field of the Invention

The present invention relates to an automotive rotary electric machine that includes a Lundell rotor.

2. Description of the Related Art

In conventional automotive dynamoelectric machines that have a Lundell rotor, circumferentially tapered portions are formed on shoulder portions of magnetic pole portions of claw-shaped magnetic poles that are positioned forward in a direction of rotation to reduce unpleasant wind noise that has high-order harmonic components (see Patent Literature 1, for example).

CITATION LIST

Patent Literature

Patent Literature 1: Japanese Patent No. 3929615 (Gazette)

SUMMARY OF THE INVENTION

In automotive rotary electric machines of this kind, in order to achieve compactness and high output, it is important to improve the amount of effective magnetic flux, which is the amount of magnetic flux that interlinks with a stator coil among the magnetic flux that is generated by a rotor. In order to improve this amount of effective magnetic flux, it is important to suppress magnetic leakage flux that arises between the magnetic pole portions of circumferentially adjacent claw-shaped magnetic poles. However, in conventional automotive rotary electric machines, no consideration has been given to suppressing magnetic leakage flux that arises between the circumferentially adjacent magnetic pole portions.

The present invention aims to solve problems such as that mentioned above and an object of the present invention is to provide a compact automotive rotary electric machine that can improve output.

An automotive alternator according to the present invention includes: a rotor including: a pole core that is fixed to a rotating shaft that is rotatably supported by a case, the pole core being disposed inside the case; and a field coil that is mounted to the pole core; and a stator including: a stator core; and a stator coil that is mounted to the stator core, the stator being disposed inside the case so as to be coaxial to the rotor so as to surround the rotor. The pole core includes a first pole core and a second pole core, the first pole core includes: a disk-shaped first main body portion; a first yoke that protrudes axially from a central portion of the first main body portion; and a plurality of first claw-shaped magnetic poles that are disposed on an outer circumferential portion of the first main body portion at a uniform angular pitch in a circumferential direction, the first claw-shaped magnetic pole portions each include: a first root portion that protrudes radially outward from the outer circumferential portion of the first main body portion; and a first magnetic pole portion that protrudes axially from an upper end of the first root portion, the second pole core includes: a disk-shaped second main body portion; a second yoke that protrudes axially from a central portion of the second main body portion; and second claw-shaped magnetic poles that are equal in number to the first claw-shaped magnetic pole portions, the second claw-shaped magnetic poles being disposed on an outer circumferential portion of the second main body portion at a uniform angular pitch in a circumferential direction, and the second claw-shaped magnetic pole portions each include: a second root portion that protrudes radially outward from the outer circumferential portion of the second main body portion; and a second magnetic pole portion that protrudes axially from an upper end of the second root portion. The first pole core and the second pole core are fixed to the rotating shaft in a state in which a protruding end of the first yoke and a protruding end of the second yoke are butted together, and in which the first magnetic pole portions and the second magnetic pole portions are arranged alternately, and a first side surface of the first magnetic pole portions and a second side surface of the second magnetic pole portions that face each other in a circumferential direction are configured into parallel flat surfaces. A circumferentially tapered portion is formed on a circumferential shoulder portion of at least one magnetic pole portion of the first magnetic pole portions and the second magnetic pole portions that face each other in the circumferential direction, and a portion of the circumferentially tapered portion enters a region in which the second side surface and the first side surface that face each other in the circumferential direction overlap when viewed from a direction that is perpendicular to the first side surface and the second side surface.

According to the present invention, a circumferentially tapered portion is formed on a circumferential shoulder portion of at least one magnetic pole portion of first magnetic pole portions and second magnetic pole portions that face each other in a circumferential direction, and a portion of the circumferentially tapered portion enters a region in which a second side surface and a first side surface that face each other in the circumferential direction overlap when viewed from a direction that is perpendicular to the first side surface and the second side surface. Thus, magnetic leakage flux that flows between the first magnetic pole portions and the second magnetic pole portions that face each other in the circumferential direction is reduced, increasing the amount of effective magnetic flux such that output is improved. In addition, because the magnetic leakage flux that flows between the first magnetic pole portions and the second magnetic pole portions can be reduced without widening spacing between the first magnetic pole portions and the second magnetic pole portions that face each other in the circumferential direction, axial lengths of a first root portion and a second root portion can be made shorter, enabling radial dimensions of a rotor to be reduced.

DETAILED DESCRIPTION OF THE PREFERRED EMBODIMENTS

Embodiment 1

Figure 1:
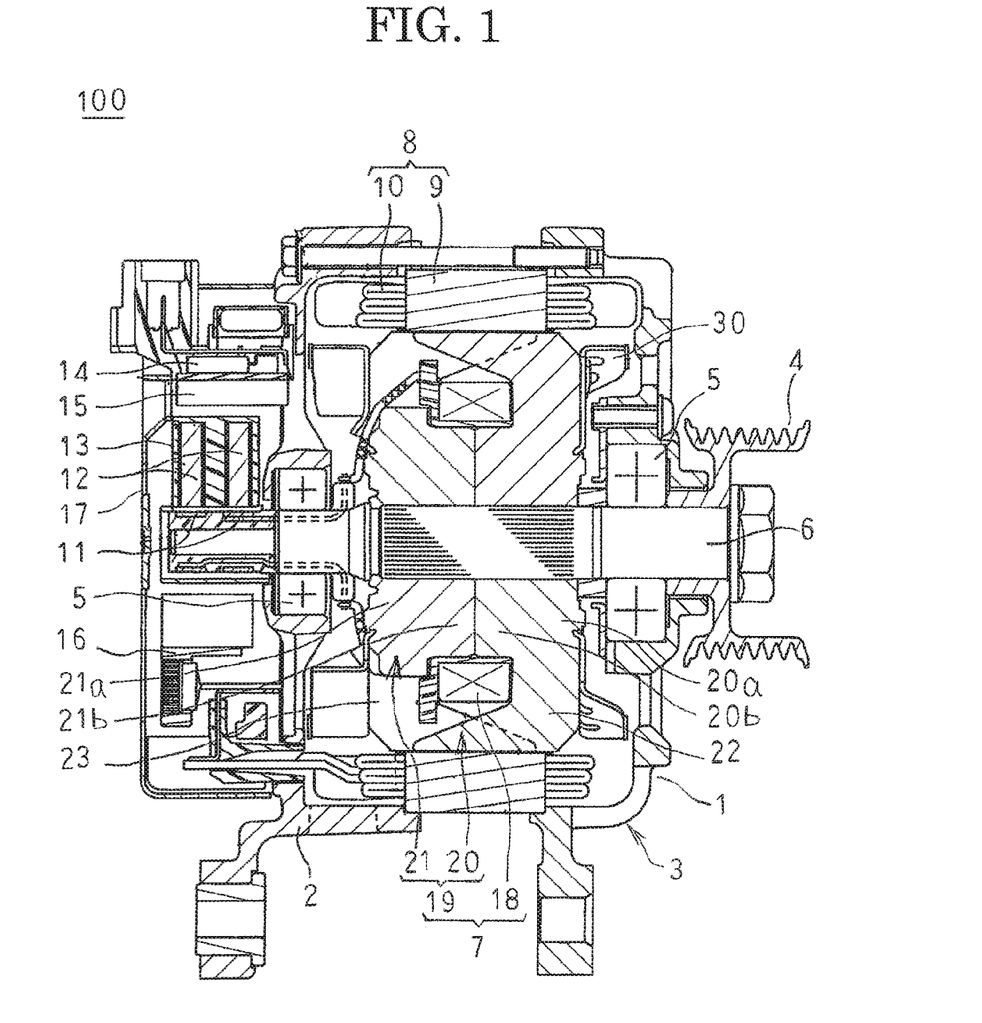
FIG. 1 is a cross section that shows an automotive alternator according to Embodiment 1 of the present invention.
Figure 2:
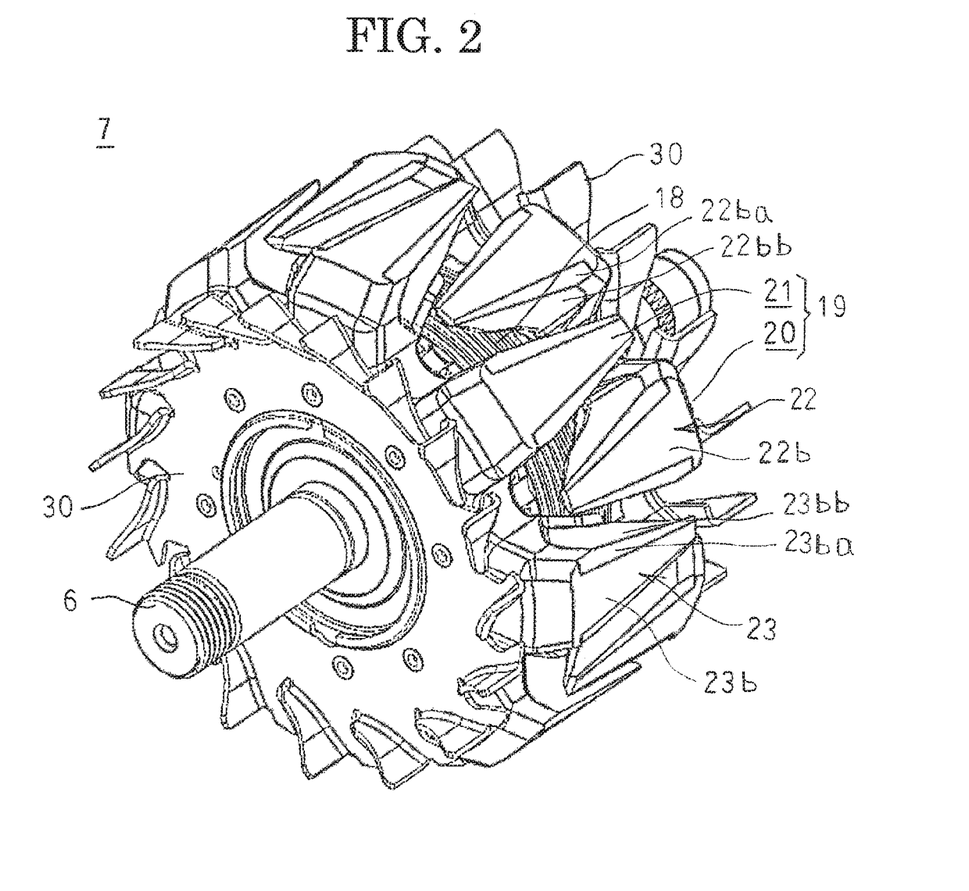
FIG. 2 is an oblique projection that shows a rotor of the automotive alternator according to Embodiment 1 of the present invention.

FIG. 1 is a cross section that shows an automotive alternator according to Embodiment 1 of the present invention, and FIG. 2 is an oblique projection that shows a rotor of the automotive alternator according to Embodiment 1 of the present invention. Moreover, to facilitate explanation, "an axial direction" is an axial direction of the rotating shaft, "a radial direction" is a radial direction of the rotating shaft, and "a circumferential direction" is a direction of rotation of the rotating shaft.

In FIGS. 1 and 2, an automotive alternator 100 that constitutes an automotive rotary electric machine includes: a case 3 that is constituted by a front bracket 1 and a rear bracket 2 that are made of aluminum; a Lundell rotor 7 that is housed inside the case 3 so as to be fixed to a rotating shaft 6 that is supported in the front bracket 1 and the rear bracket 2 by means of bearings 5; and a stator 8 that has an annular stator core 9 and a stator coil 10 that is mounted to the stator core 9, the stator 8 being held so as to be coaxial to the rotor 7 to the case 3 so as to surround the rotor 7 so as to ensure an extremely small air gap from the rotor 7.

A pulley 4 is fixed to a first end of the rotating shaft 6 such that rotational torque from an engine can be transmitted to the rotating shaft 6 by means of a belt (not shown). A pair of slip rings 11 that supply electric current to the rotor 7 are fixed to a second end portion of the rotating shaft 6 that protrudes outward from the rear bracket 2. A brush holder 13 is disposed axially outside the rear bracket 2. A pair of brushes 12 are housed in the brush holder 13 so as to slide on each of the slip rings 11. A regulator 14 that adjusts magnitude of an alternating-current voltage that arises in the stator 8 is held so as to be fixed by adhesive to a heat sink 15 that is fitted onto the brush holder 13. A rectifier 16 that is electrically connected to the stator 8 and that rectifies alternating current that is generated in the stator 8 into direct current is disposed axially outside the rear bracket 2. A rear cover 17 is mounted to the rear bracket 2 so as to cover the brush holder 13, the regulator 14, and the rectifier 16, etc.

The rotor 7 is constituted by: a field coil 18 that generates magnetic flux on passage of electric current; and a pole core 19 that is disposed so as to cover the field coil 18, and in which magnetic poles are formed by the magnetic flux that is generated by the field coil 18. The pole core 19 includes a first pole core 20 and a second pole core 21. Fans 30 are fixed to two axial end surfaces of the pole core 19.

Figure 3:
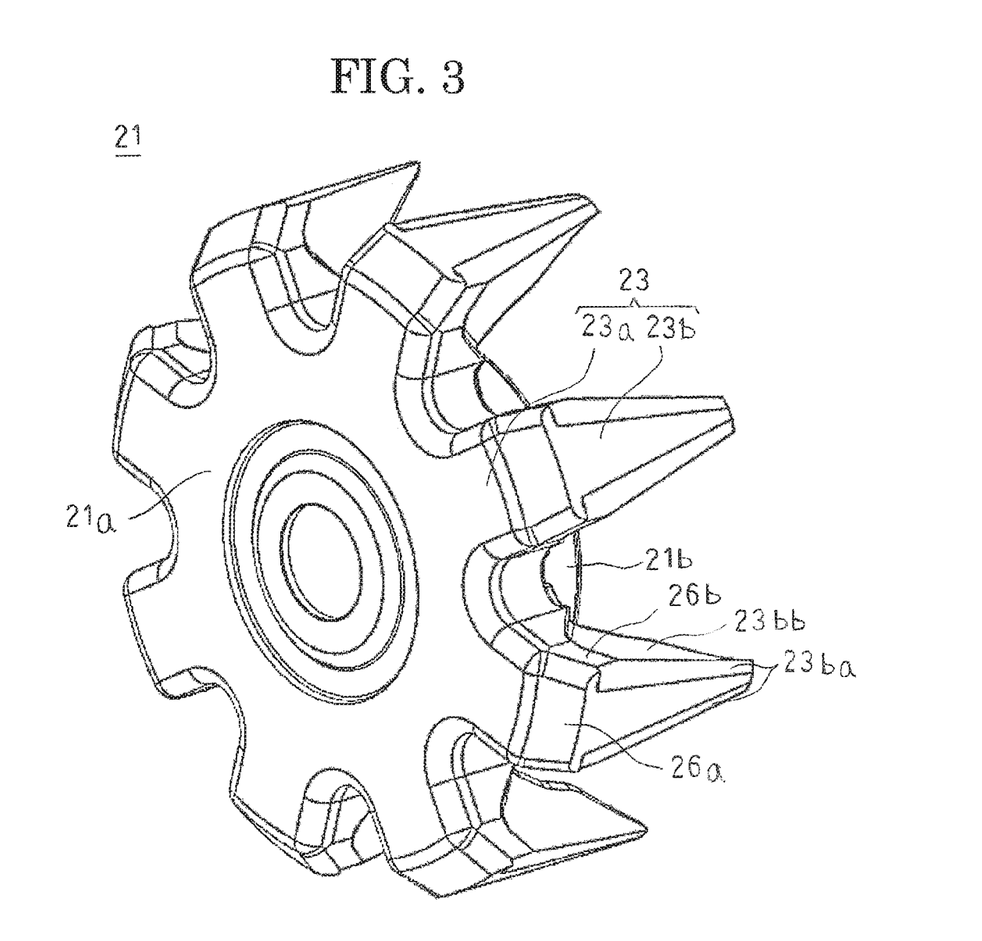
FIG. 3 is an oblique projection that shows a second pole core in the rotor of the automotive alternator according to Embodiment 1 of the present invention.
Figure 4:
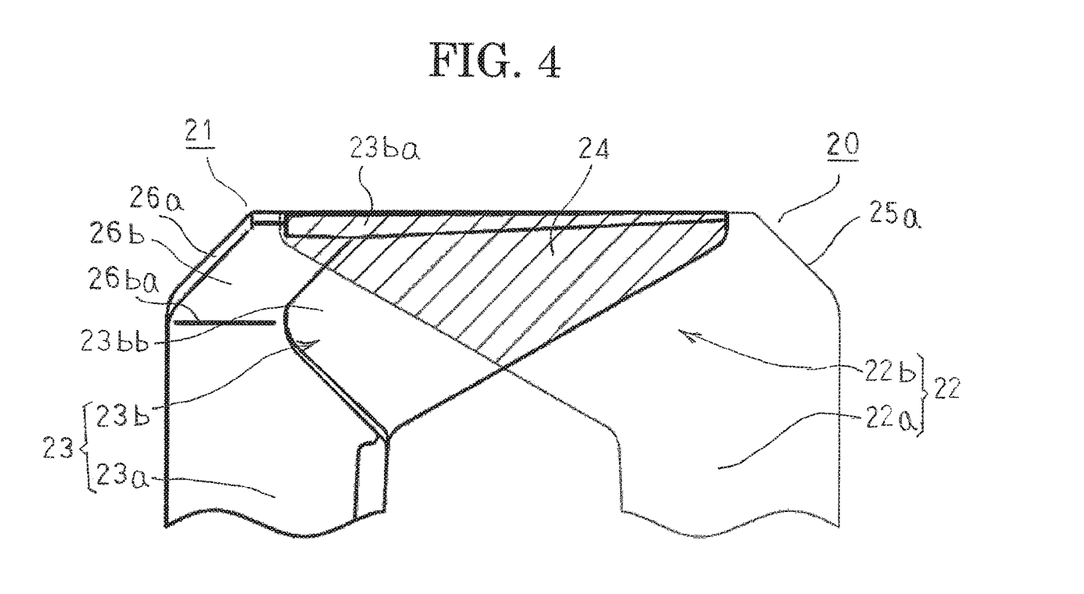
FIG. 4 is a diagram that explains a relationship between adjacent first pole cores and second pole cores in a circumferential direction of claw-shaped magnetic poles in the rotor of the automotive alternator according to Embodiment 1 of the present invention.
Figure 5:
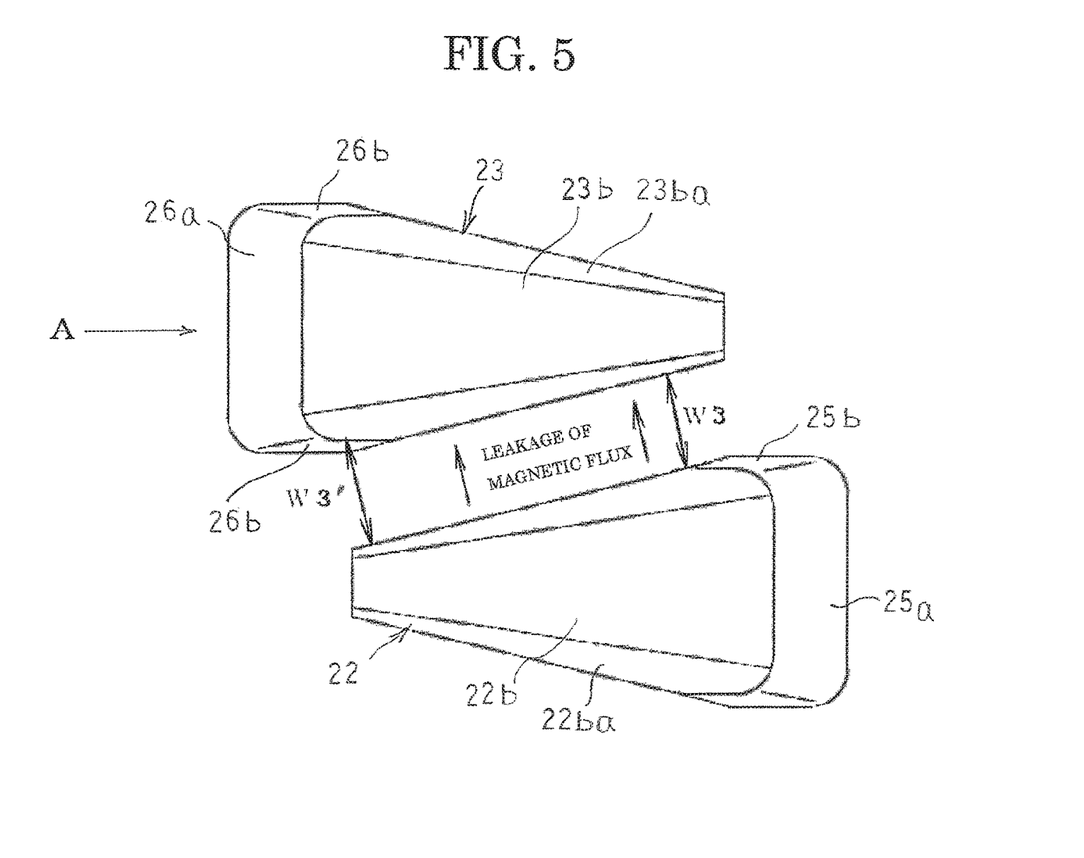
FIG. 5 is a plan that shows the adjacent first pole cores and second pole cores in the rotor of the automotive alternator according to Embodiment 1 of the present invention when viewed from radially outside.
Figure 6:
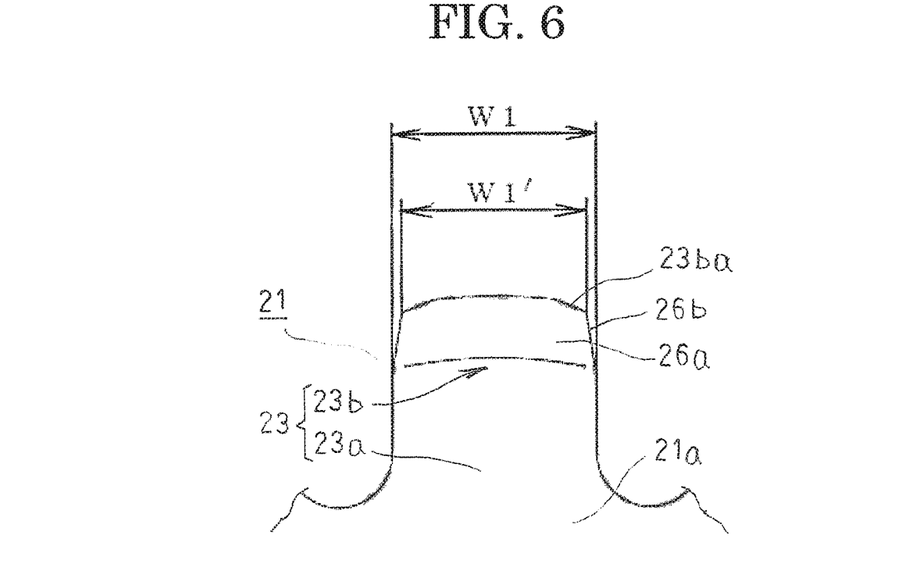
FIG. 6 is an end elevation of a claw-shaped magnetic pole of the second pole core in FIG. 5 from Direction A.

Next, a shape of the second pole core 21 will be explained with reference to FIGS. 3 through 6. FIG. 3 is an oblique projection that shows a second pole core in the rotor of the automotive alternator according to Embodiment 1 of the present invention, FIG. 4 is a diagram that explains a relationship between adjacent first pole cores and second pole cores in a circumferential direction of claw-shaped magnetic poles in the rotor of the automotive alternator according to Embodiment 1 of the present invention, FIG. 5 is a plan that shows the adjacent first pole cores and second pole cores in the rotor of the automotive alternator according to Embodiment 1 of the present invention when viewed from radially outside, and FIG. 6 is an end elevation of a claw-shaped magnetic pole of the second pole core in FIG. 5 from Direction A.

The second pole core 21 is produced by forging a low carbon steel, for example, and has: a disk-shaped second main body portion 21a; a cylindrical second yoke 21b that is disposed so as to protrude in a first axial end direction from a central portion of this second main body portion 21a; and second claw-shaped magnetic poles 23 that are formed so as to protrude radially outward from an outer circumference of the second main body portion 21a, and then be bent in a first axial end direction. Portions of the second claw-shaped magnetic poles 23 that protrude radially outward from the outer circumference of the second main body portion 21a constitute second root portions 23a, and portions thereof that protrude in the first axial end direction from the second root portions 23a constitute second magnetic pole portions 23b. In this case, eight second claw-shaped magnetic poles 23 are disposed on an outer circumferential edge portion of the second main body portion 21a at a uniform angular pitch circumferentially.

The second claw-shaped magnetic poles 23 are formed so as to have a tapered shape in which a radially outermost surface shape thereof is an approximately trapezoidal shape, a circumferential width gradually becomes narrower toward a vicinity of a tip, and a radial thickness gradually becomes thinner toward the vicinity of the tip. Radially outermost surfaces of the second magnetic pole portions 23b are constituted by portions of a cylindrical surface that has a central axis of the rotating shaft 6 as a central axis. Two edge portions in a circumferential direction of the radially outermost surfaces of the second magnetic pole portions 23b are beveled to form second tapered surfaces 23ba. Second side surfaces 23bb that are positioned on two circumferential sides of the second magnetic pole portions 23b are formed into flat surfaces.

Shoulder portions that are positioned in a vicinity of second axial ends on radially outer sides of the second magnetic pole portions 23b are beveled to constitute second shoulder portion tapered portions 26a. The second shoulder portion tapered portions 26a are formed so as to have inclined surfaces in which radial positions reduce gradually toward an end surface from outer circumferential surfaces of the second magnetic pole portions 23b.

Shoulder portions that are positioned in a vicinity of second axial ends on radially outer sides on two circumferential sides of the second magnetic pole portions 23b are beveled to constitute second circumferentially tapered portions 26b. The second circumferentially tapered portions 26b are formed so as to have inclined surfaces in which radial positions reduce gradually toward side surfaces that face in a circumferential direction of the second root portions 23 from outer circumferential surfaces of the second magnetic pole portions 23b. Lower sides 26ba of the second circumferentially tapered portions 26b are parallel to an axial direction, and intersect with lower sides of the second shoulder portion tapered portions 26a at the second axial end.

Moreover, the first pole core 20 has a shape that is similar or identical to that of the second pole core 21. Specifically, the first pole core 20 has a first main body portion 20a, a first yoke 20b, and first claw-shaped magnetic poles 22. The first claw-shaped magnetic poles 22 are constituted by first root portions 22a and first magnetic pole portions 22b. Two edge portions in a circumferential direction of the radially outermost surfaces of the first magnetic pole portions 22b are beveled to form first tapered surfaces 22ba. First side surfaces 22bb that are positioned on two circumferential sides of the first magnetic pole portions 22b are formed into flat surfaces. Shoulder portions that are positioned in a vicinity of first axial ends on radially outer sides of the first magnetic pole portions 22b are beveled to constitute first shoulder portion tapered portions 25a. Shoulder portions that are positioned in a vicinity of first axial ends on radially outer sides on two circumferential sides of the first magnetic pole portions 22b are beveled to constitute first circumferentially tapered portions 25b. Lower sides of the first circumferentially tapered portions 25b are parallel to an axial direction, and intersect with lower sides of the first shoulder portion tapered portions 25a at the first axial end.

As shown in FIG. 2, the first pole core 20 and the second pole core 21 that are configured in this manner are fixed to the rotating shaft 6, which is press-fitted into rotating shaft insertion apertures that are formed at central axial positions of the first and second yokes 20b and 21b so as to butt together the second axial end surface of the first yoke 20b and the first axial end surface of the second yoke 21b and so as to intermesh the first and second magnetic pole portions 22b and 23b alternately, to constitute the pole core 19. The pole core 19 that is configured in this manner has an outer circumferential surface that is formed into a cylindrical surface, and circumferential positions of the first and second pole cores 20 and 21 are adjusted such that circumferential spacing between each of the first and second magnetic pole portions 22b and 23b is equal. The field coil 18 is disposed inside a space that is surrounded by the first and second yokes 20b and 21b and the first and second claw-shaped magnetic poles 22 and 23.

Here, as shown in FIG. 5, the facing first and second side surfaces 22bb and 23bb of the circumferentially adjacent first and second magnetic pole portions 22b and 23b are approximately parallel, and are spaced apart by a distance W3. A region 24 in which the first and second side surfaces 22bb and 23bb overlap when the first magnetic pole portion 22b is projected onto the second magnetic pole portion 23b in a direction that is perpendicular to the facing second side surface 23bb is a region that is indicated by hatching in FIG. 4. As shown in FIG. 4, portions of the second circumferentially tapered portions 26b that are formed on the second magnetic pole portion 23b enter the region 24. As shown in FIG. 6, spacing W1' between upper ends of the second circumferentially tapered portions 26b that are formed on two circumferential shoulder portions of the second magnetic pole portion 23b is shorter than a circumferential width W1 of the second root portion 23a of the second magnetic pole portion 23b. Although not shown, portions of the first circumferentially tapered portions 25b that are formed on the first magnetic pole portion 22b also enter the region 24. Spacing W1' between upper ends of the first circumferentially tapered portions 25b that are formed on two circumferential shoulder portions of the first magnetic pole portion 22b is shorter than a circumferential width W1 of the first root portion 22a of the first magnetic pole portion 22b. Thus, as shown in FIG. 5, a distance W3' between the first and second magnetic pole portions 22b and 23b is longer than a distance W3 in the portions of the region 24 where the first and second circumferentially tapered portions 25b and 26b enter.

When the automotive alternator 100 is operating, magnetic flux that is generated on passage of electric current to the field coil 18 enters the teeth of the stator core 9 across the air gap from the first magnetic pole portions 22b of the first pole core 20, flows through the core back to other teeth, enters the second magnetic pole portions 23b of the second pole core 21 across the air gap, and returns to the field coil 18. The magnetic flux that flows through this magnetic path constitutes magnetic flux that contributes to electric power generation, that is, effective magnetic flux that interlinks with the stator coil 10. A portion of the magnetic flux that is generated on passage of electric current to the field coil 18 flows from the first magnetic pole portions 22b of the first pole core 20 to the second magnetic pole portions 23b of the second pole core 21. The magnetic flux that flows through this magnetic path constitutes magnetic leakage flux that does not contribute to electric power generation. This magnetic leakage flux flows through the region 24 that is shown in FIG. 4.

According to Embodiment 1, first circumferentially tapered portions 25b are formed on two circumferential sides at first axial ends on radially outer sides of first magnetic pole portions 22b. Second circumferentially tapered portions 26b are formed on two circumferential sides at second axial ends on radially outer sides of second magnetic pole portions 22b. Portions of the first and second circumferentially tapered portions 25b and 26b enter the region 24. Because a distance W3' between the first and second magnetic pole portions 22b and 23b is longer than a distance W3 in the portions of the region 24 where the first and second circumferentially tapered portions 25b and 26b enter, magnetic flux is less likely to flow from the first magnetic pole portions 22b to the second magnetic pole portions 23b in the portions in question, reducing the amount of magnetic leakage flux. The amount of effective magnetic flux is thereby increased, enabling output to be improved.

The first and second circumferentially tapered portions 25b and 26b that are formed on all of the first and second magnetic pole portions 22b and 23b of the first and second pole cores 20 and 21 are identically shaped. In other words, the areas of the first and second circumferentially tapered portions 25b and 26b are equal. The taper angles of the first and second circumferentially tapered portions 25b and 26b are also equal. Thus, the magnetomotive force between respective pairs of first and second magnetic pole portions 22b and 23b is uniform, enabling output performance of the automotive alternator 100 to be improved. Moreover, the "taper angle" of the first circumferentially tapered portions 25b is an angle that is formed between the first circumferentially tapered portions 25b and a plane that contacts an intersecting portion between the first circumferentially tapered portions 25b and the outer circumferential surfaces of the first magnetic pole portions 22b.

Figure 7:
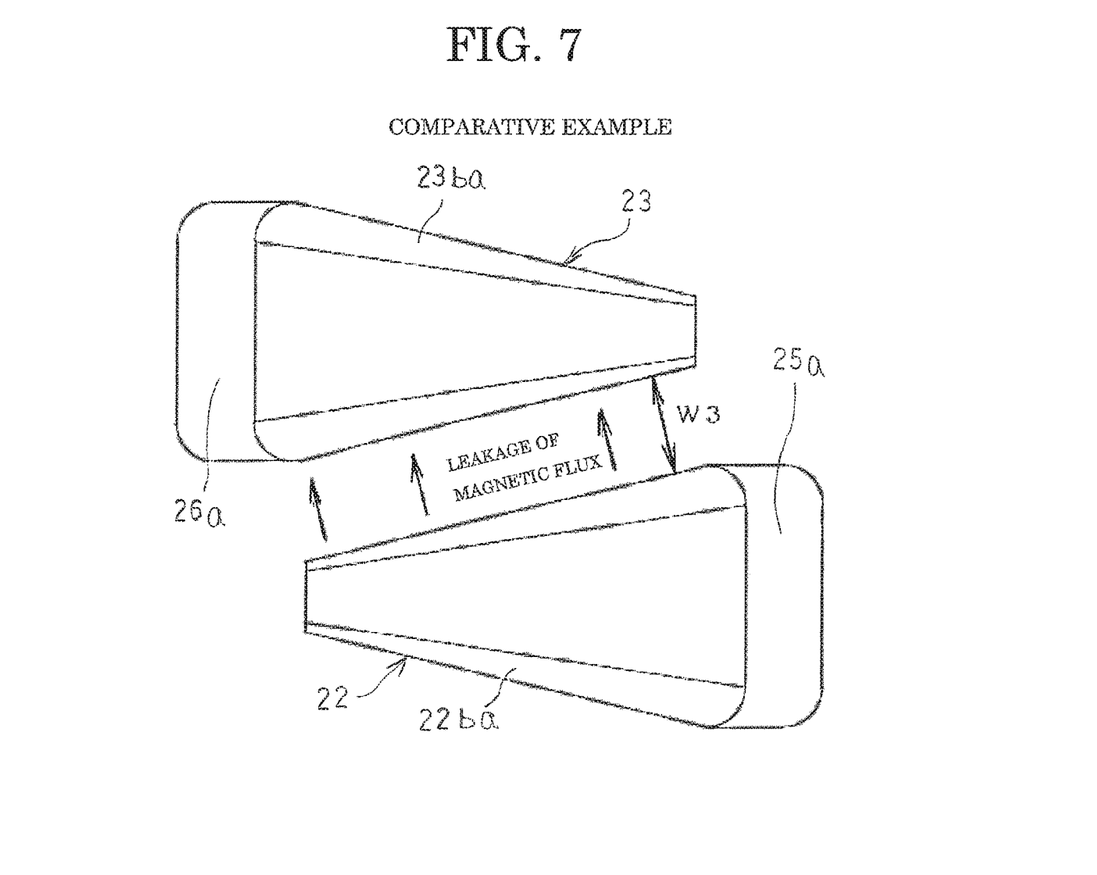
FIG. 7 is a plan that shows adjacent first pole cores and second pole cores in a comparative rotor when viewed from radially outside.
Figure 8:
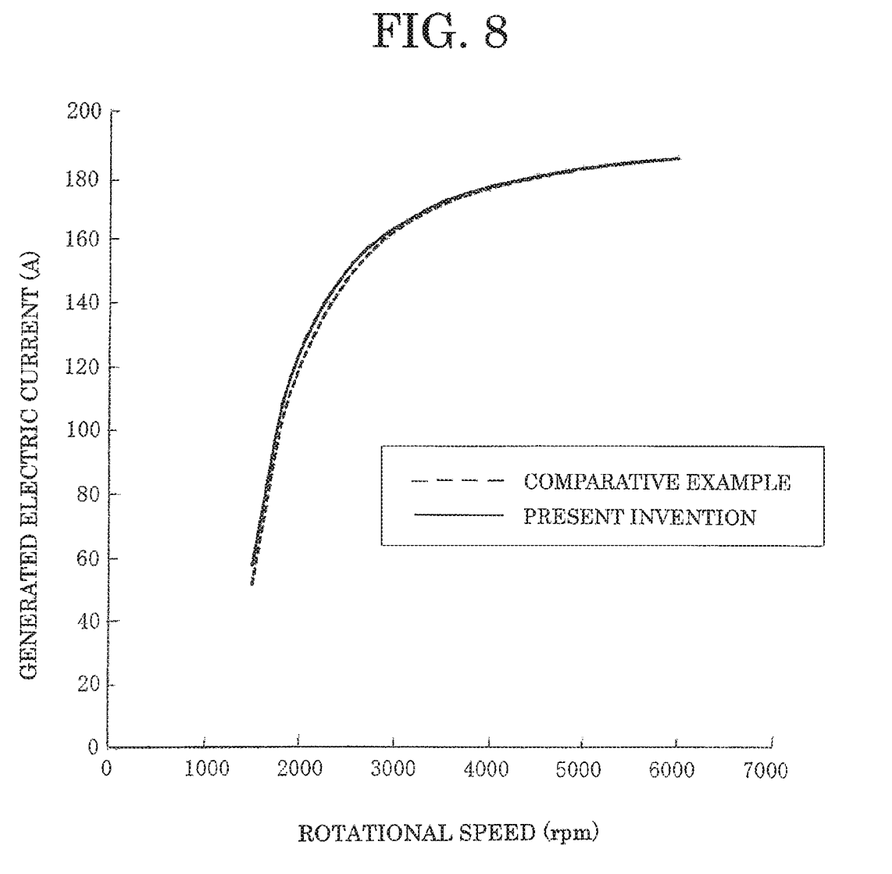
FIG. 8 is a graph that shows a relationship between rotational frequency and generated electric current in the automotive alternator according to Embodiment 1 of the present invention.

Now, results of measuring generated electric current in the automotive alternator 100 while varying rotational frequency are shown in FIG. 8. FIG. 7 is a plan that shows adjacent first pole cores and second pole cores in a comparative rotor when viewed from radially outside, and FIG. 8 is a graph that shows a relationship between rotational frequency and generated electric current in the automotive alternator according to Embodiment 1 of the present invention. Moreover, in FIG. 8, a solid line represents the automotive alternator 100 according to the present invention, and a broken line represents a comparative automotive alternator. The comparative automotive alternator is configured in a similar or identical manner to that of the automotive alternator 100 except that a rotor has been used from which the first and second circumferentially tapered portions 25b and 26b are omitted.

From FIG. 8, it was confirmed that a higher generated electric current is achieved in the automotive alternator 100 than in the comparative example in a low rotational frequency region that is less than or equal to 3,500 rpm. This is because the distance between the first and second magnetic pole portions 22b and 23b is W3 throughout the region 24 in the comparative rotor, as shown in FIG. 7. Thus, in the comparative example, the magnetic leakage flux that flows through the region 24 is not reduced, reducing the amount of effective magnetic flux. In contrast to that, in the automotive alternator 100, because a distance W3' between the first and second magnetic pole portions 22b and 23b is longer than a distance W3 in the portions of the region 24 where the first and second circumferentially tapered portions 25b and 26b enter, making magnetic flux less likely to flow from the first magnetic pole portions 22b to the second magnetic pole portions 23b in the portions in question, the amount of magnetic leakage flux is reduced. Thus, it can be inferred that the amount of effective magnetic flux is increased in the automotive alternator 100, achieving higher generated electric currents.

Figure 9:
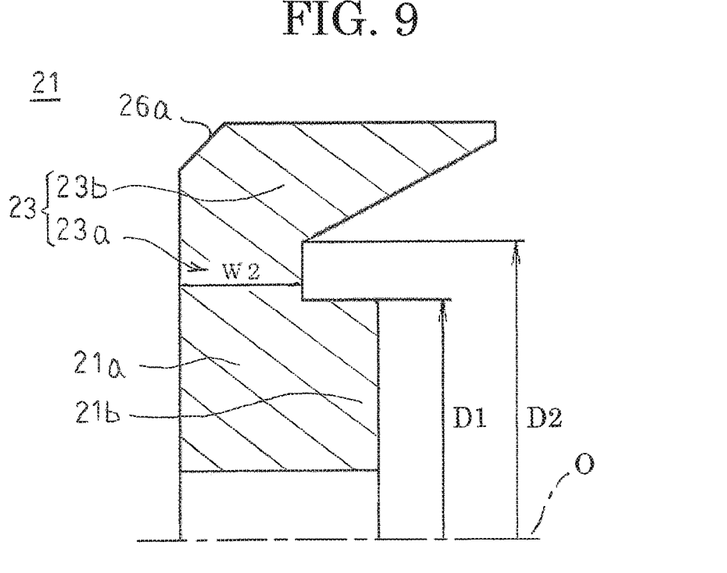
FIG. 9 is a half section that shows the second pole core in the automotive alternator according to Embodiment 1 of the present invention.

Next, effects due to being able to reduce the amount of magnetic leakage flux will be explained using FIG. 9. FIG. 9 is a half section that shows the second pole core in the automotive alternator according to Embodiment 1 of the present invention. In FIG. 9, O is a central axis of the second pole core, W2 is an axial length of the second root portion 23a of the second claw-shaped magnetic poles 23, D1 is a radius of the second yoke 21b, and D2 is a radial distance from the central axis of the rotating shaft 6 to the bending boundary between the second root portions 23a and the second magnetic pole portions 23b. Moreover, W1 is a circumferential length of the second root portion 23a.

Because the first and second root portions 22a and 23a of the first and second claw-shaped magnetic poles 22 and 23 constitute magnetic paths when the automotive alternator 100 is operating, it is necessary to ensure cross-sectional area (W1×W2) in the first and second root portions 22a and 23a such that the first and second root portions 22a and 23a are not magnetically saturated. Similarly, because the first and second yokes 20b and 21b constitute magnetic paths, it is necessary to ensure cross-sectional area in the first and second yokes 20b and 21b such that the first and second yokes 20b and 21b are not magnetically saturated, the radius D1 of the first and second yokes 20b and 21b being set to a predetermined value.

In the above-mentioned comparative example, the circumferential length W1 of the first and second root portions 22a and 23a is made shorter, and spacing W3 between the first and second magnetic pole portions 22b and 23b is widened, in order to reduce the magnetic leakage flux between the first and second magnetic pole portions 22b and 23b. Thus, it is necessary to extend the axial length W2 of the first and second root portions 22a and 23a in order to ensure the cross-sectional area of the first and second root portions 22a and 23a. As a result thereof, it is necessary to increase D2 to ensure space for housing the field coil 18, leading to an increase in the diameter of the rotor 7.

In Embodiment 1, because the first and second circumferentially tapered portions 25b and 26b are included, magnetic leakage flux between the first and second magnetic pole portions 22b and 23b can be reduced without widening the spacing W3 between the first and second magnetic pole portions 22b and 23b. Thus, the circumferential length W1 of the first and second root portions 22a and 23a can be lengthened. The cross-sectional area of the first and second root portions 22a and 23a can thereby be ensured even if the axial length W2 of the first and second root portions 22a and 23a is made shorter. As a result thereof, because D2 is reduced, and space for housing the field coil 18 can be ensured, radial dimensions of the rotor 7 can be reduced, enabling the automotive alternator 100 to be reduced in size.

Figure 10:
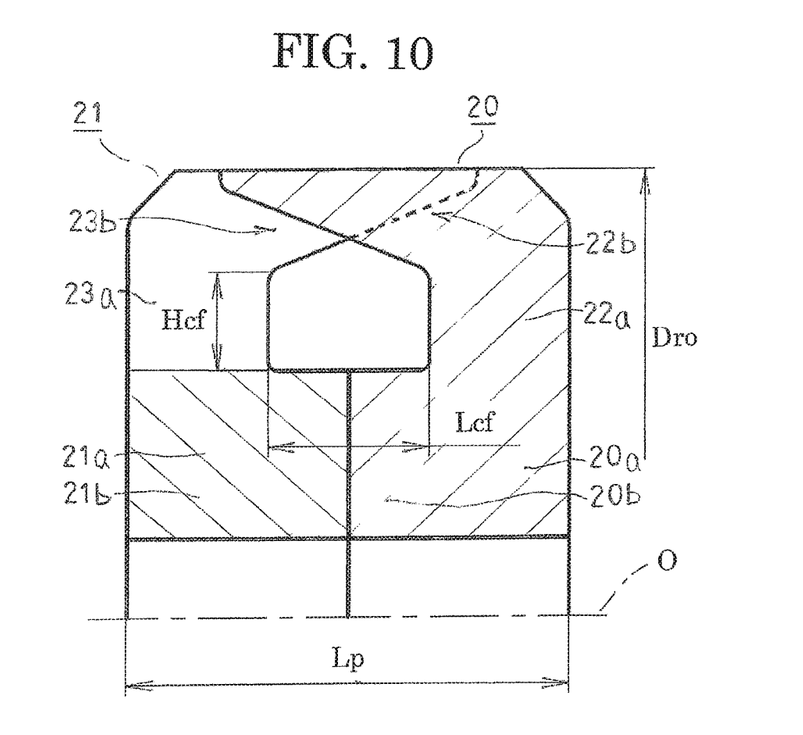
FIG. 10 is a half section that shows the pole cores of the rotor in the automotive alternator according to Embodiment 1 of the present invention.
Figure 11:
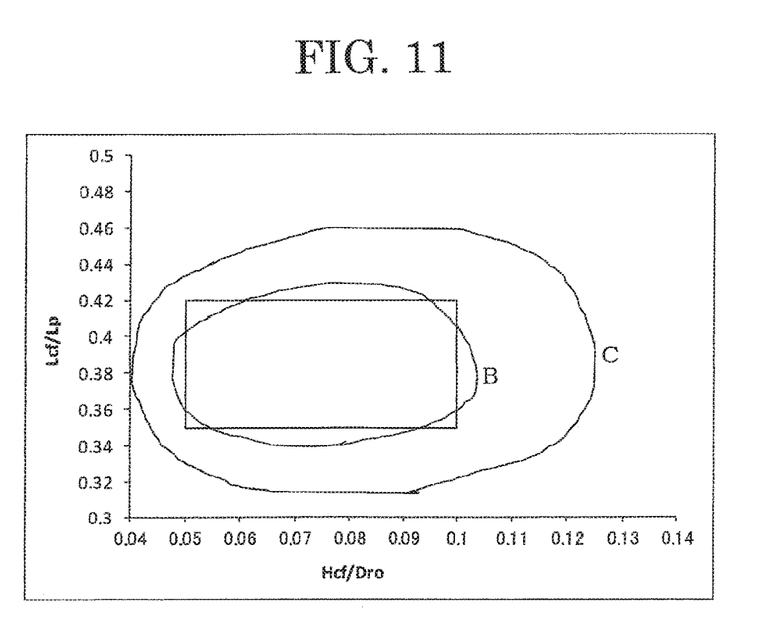
FIG. 11 is a graph that shows electric power generating characteristics of the automotive alternator according to Embodiment 1 of the present invention.

Next, results of measuring generated electric current in the automotive alternator 100 while varying Hcf/Dro and Lcf/Lp are shown in FIG. 11. FIG. 10 is a half section that shows the pole cores of the rotor in the automotive alternator according to Embodiment 1 of the present invention, and FIG. 11 is a graph that shows electric power generating characteristics of the automotive alternator according to Embodiment 1 of the present invention.

In FIG. 10, Lp is a total sum of axial lengths of the first and second pole cores 20 and 21, that is, a total axial length of the pole core 19. Dro is the diameter of the first and second pole cores 20 and 21, that is, the diameter of the pole core 19. Hcf is a radial length between an outer circumferential surface of the first and second yokes 20b and 21b and a bending boundary between the first and second root portions 22a and 23a and the first and second magnetic pole portions 22b and 23b, that is, the radial length between the outer circumferential surface of the yoke of the pole core 19 and the bending boundary between the root portions and the magnetic pole portions in the claw-shaped magnetic pole. Lcf is a total sum of the axial lengths of the first and second yokes 20b and 21b, that is, a total axial length of the yoke of the pole core 19.

FIG. 11 shows results of measuring generated electric current when operating the automotive alternator 100 at 1,800 rpm while varying Lcf/Lp and Hcf/Dro. In FIG. 11, B is a plot of Lcf/Lp and Hcf/Dro when the generated electric current is 100 A, and C is a plot of Lcf/Lp and Hcf/Dro when the generated electric current is 95 A.

From FIG. 11, it can be seen that an automotive alternator 100 that can generate high electric current that is greater than or equal to 100 A can be achieved by setting Hcf, Lcf, Dro, and Lp so as to satisfy $0.05 < Hcf/Dro < 0.10$, and $0.35 < Lcf/Lp < 0.42$. Moreover, the above-mentioned automotive alternator 100 is rated at 190 A.

Here, in Embodiment 1, because first and second circumferentially tapered portions 25b and 26b are also formed on shoulder portions of the first and second magnetic pole portions 22b and 23b that are positioned forward in the direction of rotation of the rotor 7, wind noise that has unpleasant high-order harmonic components, which constitutes a noise problem in conventional vehicles, can be reduced in a high-speed rotational region that is greater than or equal to 12,000 rpm, in a similar or identical manner to Patent Literature 1. Moreover, "forward in the direction of rotation of the rotor 7" means forward in the direction of rotation of the rotor 7 when the vehicle is moving forward.

Embodiment 2

Figure 12:
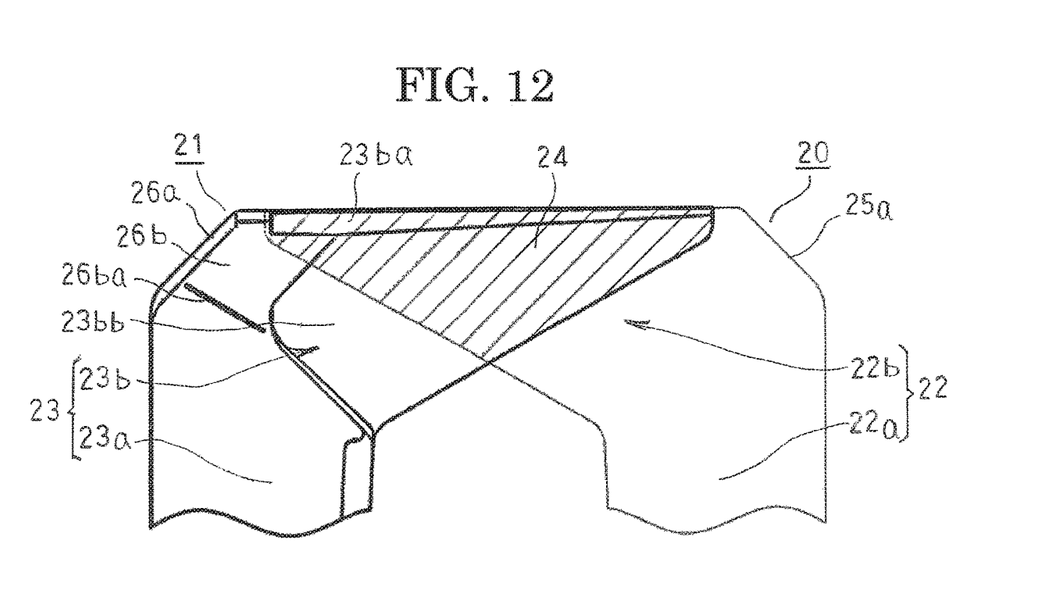
FIG. 12 is a diagram that explains a relationship between adjacent first pole cores and second pole cores in a circumferential direction of claw-shaped magnetic poles in a rotor of an automotive alternator according to Embodiment 2 of the present invention.

FIG. 12 is a diagram that explains a relationship between adjacent first pole cores and second pole cores in a circumferential direction of claw-shaped magnetic poles in a rotor of an automotive alternator according to Embodiment 2 of the present invention.

In FIG. 12, first axial ends of lower sides 26*ba* of second circumferentially tapered portions 26*b* are positioned so as to be radially level with lower sides of second shoulder portion tapered portions 26*a*, and second axial ends of the lower sides 26*ba* thereof intersect with the second shoulder portion tapered portions 26*a* so as to be further radially outward than the lower sides of the second shoulder portion tapered portions 26*a*. Although not depicted, second axial ends of lower sides of first circumferentially tapered portions 25*b* are positioned so as to be radially level with lower sides of first shoulder portion tapered portions 25*a*, and first axial ends of the lower sides thereof intersect with the first shoulder portion tapered portions 25*a* so as to be further radially outward than the lower sides of the first shoulder portion tapered portions 25*a*.

Moreover, a remainder of the configuration is configured in a similar or identical manner to that of Embodiment 1 above.

In Embodiment 2, because portions of the first and second circumferentially tapered portions 25*b* and 26*b* also enter the region 24, the amount of effective magnetic flux is increased, enabling output to be improved.

In Embodiment 2, first axial ends of lower sides 26*ba* of second circumferentially tapered portions 26*b* are positioned so as to be radially level with lower sides of second shoulder portion tapered portions 26*a*, and second axial ends of the lower sides 26*ba* thereof intersect with the second shoulder portion tapered portions 26*a* so as to be further radially outward than the lower sides of the second shoulder portion tapered portions 26*a*. Thus, taper angles of the second circumferentially tapered portions 26*b* are smaller than the taper angles of the second circumferentially tapered portions 26*b* in Embodiment 1. Similarly, taper angles of the first circumferentially tapered portions 25*b* are smaller than the taper angles of the first circumferentially tapered portions 25*b* in Embodiment 1. Because the amount of chamfering for forming the first and second circumferentially tapered portions 25*b* and 26*b* is thereby reduced, the amount of iron in the first and second pole cores 20 and 21 is increased, enabling output to be improved.

Moreover, each of the above embodiments has been explained using an automotive alternator, but the automotive rotary electric machine is not limited to an automotive alternator, and an automotive alternating-current motor, or an automotive alternator-motor can be used.

In each of the above embodiments, the number of poles in the rotor 7 is the sixteen poles, but similar or identical effects can also be achieved if the number of rotor poles is four poles or greater.

In each of the above embodiments, the first and second circumferentially tapered portions 25*b* and 26*b* are formed on the shoulder portions on two circumferential sides of all of the first and second magnetic pole portions 22*b* and 23*b*,
but it is not necessary for the first and second circumferentially tapered portions 25*b* and 26*b* to be formed on the shoulder portions on two circumferential sides of all of the first and second magnetic pole portions 22*b* and 23*b*. For example, the first circumferentially tapered portions 25*b* may be formed on the shoulder portions on two circumferential sides of all of the first magnetic pole portions 22*b*, and the second circumferentially tapered portions 26*b* omitted. Alternatively, the first and second circumferentially tapered portions 25*b* and 26*b* may be formed only on shoulder portions that are forward in the direction of rotation on all of the first and second magnetic pole portions 22*b* and 23*b*.

What is claimed is:

1. An automotive alternator comprising:
    a rotor comprising:
        a pole core that is fixed to a rotating shaft that is rotatably supported by a case, said pole core being disposed inside said case; and
        a field coil that is mounted to said pole core; and
    a stator comprising:
        a stator core; and
        a stator coil that is mounted to said stator core,
    said stator being disposed inside said case so as to be coaxial to said rotor so as to surround said rotor,
    wherein:
    said pole core comprises a first pole core and a second pole core;
    said first pole core comprises:
        a disk-shaped first main body portion;
        a first yoke that protrudes axially from a central portion of said first main body portion; and
        a plurality of first claw-shaped magnetic poles that are disposed on an outer circumferential portion of said first main body portion at a uniform angular pitch in a circumferential direction;
    said first claw-shaped magnetic poles each comprise:
        a first root portion that protrudes radially outward from said outer circumferential portion of said first main body portion; and
        a first magnetic pole portion that protrudes axially from an upper end of said first root portion;
    said second pole core comprises:
        a disk-shaped second main body portion;
        a second yoke that protrudes axially from a central portion of said second main body portion; and
        second claw-shaped magnetic poles that are equal in number to said first claw-shaped magnetic poles, said second claw-shaped magnetic poles being disposed on an outer circumferential portion of said second main body portion at a uniform angular pitch in a circumferential direction;
    said second claw-shaped magnetic poles each comprise:
        a second root portion that protrudes radially outward from said outer circumferential portion of said second main body portion; and
        a second magnetic pole portion that protrudes axially from an upper end of said second root portion;
    said first pole core and said second pole core are fixed to said rotating shaft in a state in which a protruding end of said first yoke and a protruding end of said second yoke are butted together, and in which said first magnetic pole portions and said second magnetic pole portions are arranged alternately;
    a first side surface of said first magnetic pole portions and a second side surface of said second magnetic pole portions that face each other and overlap in an overlapping region in a circumferential direction are configured into parallel flat surfaces;

a circumferentially tapered portion is formed on a circumferential shoulder portion of at least one magnetic pole portion of said first magnetic pole portions and said second magnetic pole portions that face each other in said circumferential direction; and a portion of said circumferentially tapered portion overlaps with the overlapping region when viewed from a direction that is perpendicular to said first side surface and said second side surface, wherein said first pole core and said second pole core are configured so as to satisfy $0.05<Hcf/Dro<0.10$, and $0.35<Lcf/Lp<0.42$, where Lcf is a total sum of axial lengths of said first yoke and said second yoke when butted together, Hcf is a radial length of said first yoke from an outer circumferential surface to a bending boundary between said first root portion and said first magnetic pole portion, Lp is an axial length of said pole core, and Dro is a diameter of said pole core.

2. The automotive rotary electric machine according to claim 1, wherein said circumferentially tapered portion is formed on a circumferential shoulder portion that is positioned forward in a direction of rotation of said pole core on all magnetic pole portions of a plurality of said first magnetic pole portions and said second magnetic pole portions.

3. The automotive rotary electric machine according to claim 2, wherein said circumferentially tapered portion is formed on a circumferential shoulder portion that is positioned rearward in said direction of rotation of said pole core on all magnetic pole portions of said plurality of said first magnetic pole portions and said second magnetic pole portions.

4. The automotive rotary electric machine according to claim 2, wherein said first pole core and said second pole core are identically shaped.

5. The automotive rotary electric machine according to claim 1, wherein a lower side of said circumferentially tapered portion gradually displaces radially outward in an axially outward direction.

* * * * *